United States Patent
Navarro

(10) Patent No.: US 8,552,701 B2
(45) Date of Patent: Oct. 8, 2013

(54) SYSTEM FOR REGULATING A LOAD VOLTAGE IN POWER DISTRIBUTION CIRCUITS AND METHOD FOR REGULATING A LOAD VOLTAGE IN POWER DISTRIBUTION CIRCUITS

(75) Inventor: Martin Alsina Navarro, Jundiaï SP (BR)

(73) Assignee: Siemens LTDA, Sao Paulo - SP (BR)

( * ) Notice: Subject to any disclaimer, the term of this patent is extended or adjusted under 35 U.S.C. 154(b) by 367 days.

(21) Appl. No.: 13/054,303

(22) PCT Filed: Jul. 15, 2009

(86) PCT No.: PCT/BR2009/000205
§ 371 (c)(1),
(2), (4) Date: Apr. 8, 2011

(87) PCT Pub. No.: WO2010/006397
PCT Pub. Date: Jan. 21, 2010

(65) Prior Publication Data
US 2012/0092894 A1    Apr. 19, 2012

(30) Foreign Application Priority Data
Jul. 15, 2008    (BR) ...................................... 0802444

(51) Int. Cl.
*G05F 1/40*    (2006.01)
*G05F 5/00*    (2006.01)

(52) U.S. Cl.
USPC .......................................... 323/282; 323/301

(58) Field of Classification Search
USPC ......... 323/205, 208, 209, 215, 216, 282, 285, 323/301, 305, 361
See application file for complete search history.

(56) References Cited

U.S. PATENT DOCUMENTS 5,485,075 A *   1/1996  Mori et al. .................... 323/207
6,420,856 B1    7/2002  Sen et al.
6,486,641 B2 * 11/2002  Scoggins et al. ............. 323/257

FOREIGN PATENT DOCUMENTS

EP    0 053 413 A1    6/1982
EP    1 923 765 A1    5/2008
WO    WO-98/11476 A1  3/1998

OTHER PUBLICATIONS

International Search Report and Written Opinion for International Appl. No. PCT/BR2009/000205, mailed Jun. 9, 2010.
International Preliminary Report on Patentability for International Appl. No. PCT/BR2009/000205, mailed Jan. 10, 2011.

* cited by examiner

*Primary Examiner* — Jessica Han
*Assistant Examiner* — Afework Demisse
(74) *Attorney, Agent, or Firm* — Alston & Bird LLP

(57) ABSTRACT

The present invention refers to a system for regulating a load voltage (C) in power distribution circuits comprising at least: a regulation transformer (2) the secondary winding of the regulatory transformer (2) being operatively arranged in series between a power source (F) and the load (C), the power source (F) being capable of providing a supply voltage (VAL) to the load (C); a measuring device (5) operatively associated to the load (C), the measuring device (5) being capable of measuring at least one value of an electric signal of the load (SCA); a control device (4) operatively associated to the measuring device (5), the control device (4) being capable of comparing the value of the electric signal of the load (SCA) with a pre-established reference value and providing a correcting electric signal (SCO); and an actuation device (3) operatively associated to the control device (4), wherein the actuation device (3) is capable of providing an adjustment voltage (VAJ) proportional to the correcting electric signal (SCO), the adjustment voltage (VAJ) being applicable to fixed electric taps of the primary winding of the regulation transformer (2), the fixed electric taps being configured to remain immovable when there is a variation of the adjustment voltage (VAJ), the regulation transformer (2) being capable of transforming the adjustment voltage (VAJ) into a regulation voltage (VRE), the regulation voltage (VRE) being added in module and phase to the supply voltage (VAL). The present invention also refers to a method executed by the above-mentioned system.

7 Claims, 2 Drawing Sheets

SYSTEM FOR REGULATING A LOAD VOLTAGE IN POWER DISTRIBUTION CIRCUITS AND METHOD FOR REGULATING A LOAD VOLTAGE IN POWER DISTRIBUTION CIRCUITS

The present invention refers to a system for regulating a load voltage in power distribution circuits. More particularly, the invention refers to a system capable of automatically adjusting a voltage supplied by a power distribution circuit to at least one load, increasing or decreasing its value, pursuant to variations in measurements of electric signals of said load.

The present invention also refers to a method for regulating the load voltage in power transmission and distribution circuits.

DESCRIPTION OF THE STATE OF THE ART

In electric power transmission and distribution circuits, it is essential that the voltage supplied to the user be kept constant so as to avoid disruptions such as, for example, mal functioning and damage to industrial equipment, household appliances, electronic and computing items. Accordingly, equipments are used that enable the voltage to be increased or decreased, as the demand so requires. Due to various factors such as, for example, alterations in load, voltage regulators and/or transformers are used, associated to switchers under load capable of altering the voltage automatically, without interrupting the supply of power to the user.

The voltage regulator basically comprises a transformer having a winding provided with shunts or taps, with a certain turn ratio, linked to a mechanical switch under load. Normally, the mechanical switch is mounted inside a tank comprised by the transformer, submersed in insulating oil (mineral oil). In this sense, the tank should have its volume oversized due to the need to install the switch in its inner portion, which also means an increased volume of insulating liquid.

Some types of voltage regulators also comprise a reactor linked to the switch contacts to limit the electric current and provide an intermediary voltage between two positions of said taps.

Generally, the connection position of the taps to a mechanical switch is automatically shifted by a control system, which measures the load current from an electronic panel and commands the drive of the switch, from the voltage of the load. Switching to a tap defined by the control system is done mechanically by the displacement of the movable contacts that slide over the surface of the fixed contacts deployed in a circle, avoiding the interruption of the current energizing. Said displacement between taps requires an electric motor and other mechanical parts, such as gearwork, supports, among others, and each change of tap creates an electric arc between the movable contact and the fixed contact.

Said electric arc removes metal particles from the contacts, causing its wear and contributing to the formation of inflammable gases which contaminate the insulating oil, decreasing its insulation feature and even causing the risk of explosion under certain conditions.

Additionally, there are voltage regulators capable of altering the direction of the current circulation in the taps, whereby altering its polarity, enabling that this setting increase or decrease the voltage required according to the position of the taps, wherein each tap corresponds to a certain turn ratio, thus being added or subtracted according to the polarity of the switch.

However, since the switch is mechanical and is rotated over the windings of the transformer, there is the drawback of needing to limit the adjustment of the output voltage to a fixed and limited number of positions of the switch, in addition to generating electric arcs upon each change of position, as already mentioned previously.

Accordingly, the switchers are submitted to constant wear, requiring periodic maintenance for cleaning and even replacement, demanding transport of the regulators to a suitable site, involving undesirable expenses and disruptions. This transport contributes to the increase in risk of leakage of the insulating oil in a potential accident situation, jeopardizing the environment and people. Additionally, the transport requires expenditures with human resources, appliances, vehicles, fuel, and other items. These expenses are passed onto the consumers through additional taxes.

Such dangerous situations, as well as the high expenditures involved with frequent maintenance of the voltage regulator, could be decreased and/or avoided if the mechanical switch were substituted for a system that increased or decreased the output voltage, without generating electric arcs and without using insulating oil.

Some of the problems mentioned above are detected in the following solutions, known in the state of the art, presented below.

Brazilian Patent Document PI 0110005-0 describes a switching transformer connected to the input terminals of a voltage source $V_E$ to be regulated. Said transformer presents a variable turn ratio k so as to generate a voltage $kV_E$ in its secondary. This turn ratio is controlled by control and command devices based on the output voltage $V_s$ of the voltage adapter. The voltage $kV_E$ is fed to a second transformer having a fixed turn ratio k', connected in series to the voltage adapter output. The transformer generates a voltage $k'kV_E$ in its secondary which is added to the voltage $V_s$ of the adapter. This arrangement is only applicable for a low voltage network, in addition to comprising mechanical switchs that have the drawback of limiting the regulation of the output voltage to a fixed number of activated switchs, and electric arcs are still generated upon each change of actuation.

British document UK 2324389 describes a transformer which secondary is connected in series to a controlled voltage line, to add or subtract voltage to or from the line. The primary of this transformer is coupled to a switching network formed by a transformer having a variable turn ratio, which is controlled by a loop comprising a microprocessor and 4 relay. This arrangement also comprises closed relay contacts, limiting the shifting of the output voltage to a fixed number of activated contacts, besides generating electric arcs upon each change of actuation.

Accordingly, the documents of the state of the art do not describe a full and satisfactory solution to solve all the existing problems, besides presenting apparently high implementation and maintenance costs.

OBJECTIVES OF THE INVENTION

A first objective of the present invention consists of providing a system capable of automatically regulating an electric voltage supplied to a load comprised by an electric power distribution circuit, without the need to interrupt the supply of electric power to the load, so reducing and simplifying maintenance and the replacements required by systems known in the state of the art, further reducing the costs and risks to the environment and to people.

A second objective of the present invention consists of providing a method for automatically regulating an electric voltage supplied to a charge comprised by an electric power distribution circuit.

BRIEF DESCRIPTION OF THE INVENTION

The first objective of the present invention is achieved through the provision of a system for regulating a load voltage in power distribution circuits comprising at least: a regulation transformer having a primary winding and a secondary winding, the secondary winding of the regulation transformer being operatively arranged in series between the power source and the load, the power source being capable of providing a supply voltage to the load; a measuring device operatively associated to the load, the measuring device being capable of measuring at least one value of an electric signal of the load; a control device operatively associated to the measuring device, the control device being capable of comparing the value of the electric signal of the load with a pre-established reference value and providing a correcting electric signal; and an actuation device operatively associated to the control device, wherein the actuation device is capable of providing an adjustment voltage proportional to the correcting electric signal, the adjustment voltage being applicable to fixed electric taps of the primary winding of the regulation transformer, the fixed electric taps being configured to remain immovable when there is a variation of the adjustment voltage, the regulation transformer being capable of transforming the adjustment voltage applied to the primary winding into a regulation voltage to be applied to the secondary winding, the regulation voltage being added in module and phase to the supply voltage.

The second objective of the present invention is achieved through the provision of a method that comprises the steps of: i) supplying a supply voltage to the load; ii) measuring at least one value of an electric signal of the load; iii) comparison between at least one value of the electric signal of the load obtained in step ii with a pre-established reference value; iv) calculating and providing a correcting electric signal; v) providing an adjustment voltage from the correcting electric signal obtained in step iv; vi) transforming the adjustment voltage obtained in step v into a regulation voltage; vii) adding in module and phase of the regulation voltage obtained in step iv with the supply voltage; and viii) supplying the sum of voltages obtained in step vii for the load.

BRIEF DESCRIPTION OF THE DRAWINGS

The present invention will now be described in greater detail, with reference to the appended drawings, wherein.

DETAILED DESCRIPTION OF THE DRAWINGS

Figure 1:
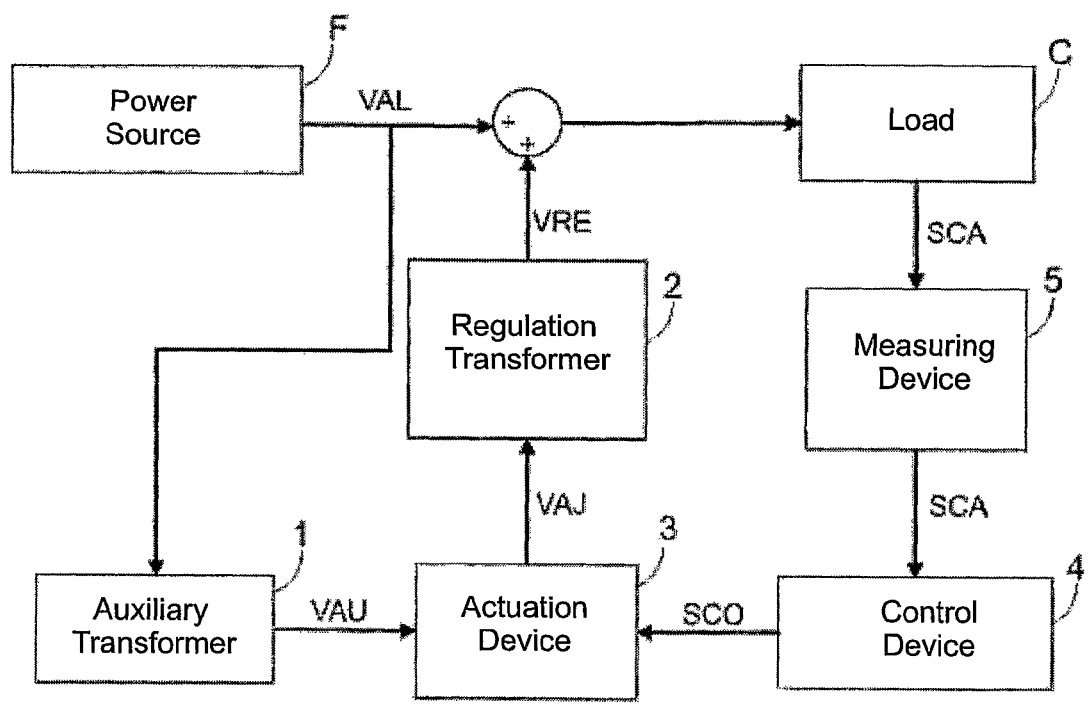
FIG. 1—represents a schematic block diagram of a system for regulating a load voltage in power distribution circuits, the object of the present invention.

FIG. 1 illustrates a schematic block diagram of a system for regulating a load C voltage in power distribution circuits, according to a preferred embodiment of the present invention.

The power distribution circuit preferably consists of a circuit capable of providing electric power to loads C such as, for example, residences, households, buildings, condominiums, factories, industrial plants, as well as power stations and sub-stations. Therefore, the system for regulating the present invention is applicable preferably in high voltage circuits such as, for example, in the order of 13800 V, 24200 V or 34500 V. Optionally, the system can also be applied to average and/or low voltage circuits.

As can be seen in FIG. 1, said system comprises at least a power source F capable of providing a supply voltage VAL to the load C.

The load C is associated to a regulation transformer 2 having a primary winding and a secondary winding operatively arranged in series between the power source F and the load C.

The load C is also operatively associated to a measuring device capable of measuring at least one value of an electric signal of the load SCA.

The measuring device 5 preferably but not obligatorily consists of a multimeter capable of measuring the voltage signal of the load and/or a current signal of the load.

The voltage measuring device 5 is operatively associated to a control device 4 capable of comparing the value of the electric signal of the load SCA with a pre-established reference value. This reference value consists of a value considered excellent, proportional to an ideal voltage value which is desirable to supply to the load C.

The control device 4 is also capable of providing a correcting electric signal SCO which can be a voltage or electric current, depending on the form of implementing the system.

Preferably, the control device 4 comprises at least a microprocessor or a microcontroller capable of running a computer program that allows the provision of the correcting electric signal SCO. The correcting electric signal SCO consists of a digital and/or analog electric signal that can be provided directly by an output pin of the microprocessor or microcontroller, or can be provided by a filter (circuit or electric component) associated to said output pin. The computer program can be stored in an external memory associated to the microprocessor or microcontroller or stored in an internal memory of the microprocessor or microcontroller.

Accordingly, the comparison, calculation and provision of the correcting electric signal SCO are carried out by a control algorithm contained in the computer program.

Additionally, it is also possible to establish a permitted tolerance value (error), wherein the control device 4 is configured to provide the correcting electric signal SCO only when there is extrapolation of the value of the electric signal of the load SCA beyond the limits determined by this tolerance. Optionally, the control device 4 can be configured to provide the correcting electric signal SCO constantly, regardless of the magnitude of the difference between the value of the electric signal of the load SCA and the pre-established reference value. Further, other parameters can be included, if necessary.

Evidently, both the pre-established reference value and the tolerance value can be adjusted and altered pursuant to the application, convenience and needs.

The control device 4 also comprises an interface panel for interaction with an operator. The interface panel has visualization means (e.g. LCD display) and command buttons/keys.

Alternatively, the control device 4 can be implemented integrally by analog electronic components and/or integrated circuits (chips) operatively associated amongst themselves, so as to dispense with the use of a microprocessor or microcontroller.

The control device 4 is operatively associated to an actuation device 3 capable of providing an adjustment voltage VAJ, proportional to the correcting electric signal SCO, to the regulation transformer 2. More particularly, an adjustment voltage VAJ is applicable to fixed electric taps of the primary winding of the regulation transformer 2. This adjustment voltage VAJ is transformed by the regulation transformer 2 into a regulation voltage VRE to be applied to its secondary winding.

Bearing in mind that the secondary winding of the regulation transformer is associated in series between the power source F and the load C, the regulation voltage VRE is added in module and phase to the supply voltage VAL, so as to correct or adjust the voltage provided to the load C, according to the demands and variations presented by the power distribution circuit. Therefore, the fixed electric taps remain immovable when there is a variation in the adjustment voltage VAJ. The correction (adjustment) of the voltage provided to the load C is performed entirely electronically, without involving any kind of movement of mechanical parts.

Therefore, contrary to systems known in the state of the art, the system of the present invention does not use movable mechanical contacts that generate electric arcs capable of accelerating wear and requiring frequent maintenance.

Besides, the system of the present invention dispenses with the use of insulating oil, eliminating the risk of contaminating the environment, fire and explosion upon implementation, maintenance and transport as may be necessary.

Additionally, the system of the present invention dispenses with the use of an electric motor and other mechanical parts, such as gearwork, supports, among others, which simplifies and reduces the final costs involved in its implementation and maintenance.

Furthermore, the variation of the regulation voltage VRE is performed on a continual basis, without steps of voltage, whereby permitting finer voltage adjustments with greater precision, optimizing the performance of the equipments and economizing power.

It is also important to note that the operations of measuring, comparing, correcting/adjusting, transforming, adding and strengthening of the corrected voltage to the load C is performed automatically by the system, according to the measurement variations of the voltage or current of the load C, without any kind of power interruption.

The actuation device 3 comprises at least one power circuit capable of handling the correcting electric signal SCO to provide the adjustment voltage VAJ. As already described previously, the value of the adjustment voltage VAJ is proportional to the value of the correcting electric signal SCO.

The internal power circuit has, for example, at least one AC/DC converter and/or one DC/AC converter and/or amplifying circuits. The AC/DC, DC/AC converters and the amplifying circuits are widely known in the state of the art and will not be discussed herein.

Therefore, the specification configuration of the actuation device 3 may vary according to the convenience and needs of use, and it is irrelevant to define the scope of protection of the invention.

The actuation device 3 is electrically powered by an auxiliary transformer 1, as can be seen in FIG. 1. This way, the auxiliary transformer 1, operatively arranged between the power source F and the actuation device 3, is capable of providing an auxiliary voltage VAU to the actuation device 3.

The auxiliary transformer 1 preferably consists of a power transformer. Said transformer has a high voltage (primary winding) side associated to the power source F and a low voltage side associated to the actuation device 3.

Thus, it is possible to reduce the risk of accidents when accessing and/or performing maintenance on the actuation device 3, control device 4 and on the regulation transformer 2, as the entire control for providing the regulation voltage VRE is carried out on the low voltage side.

Figure 2:
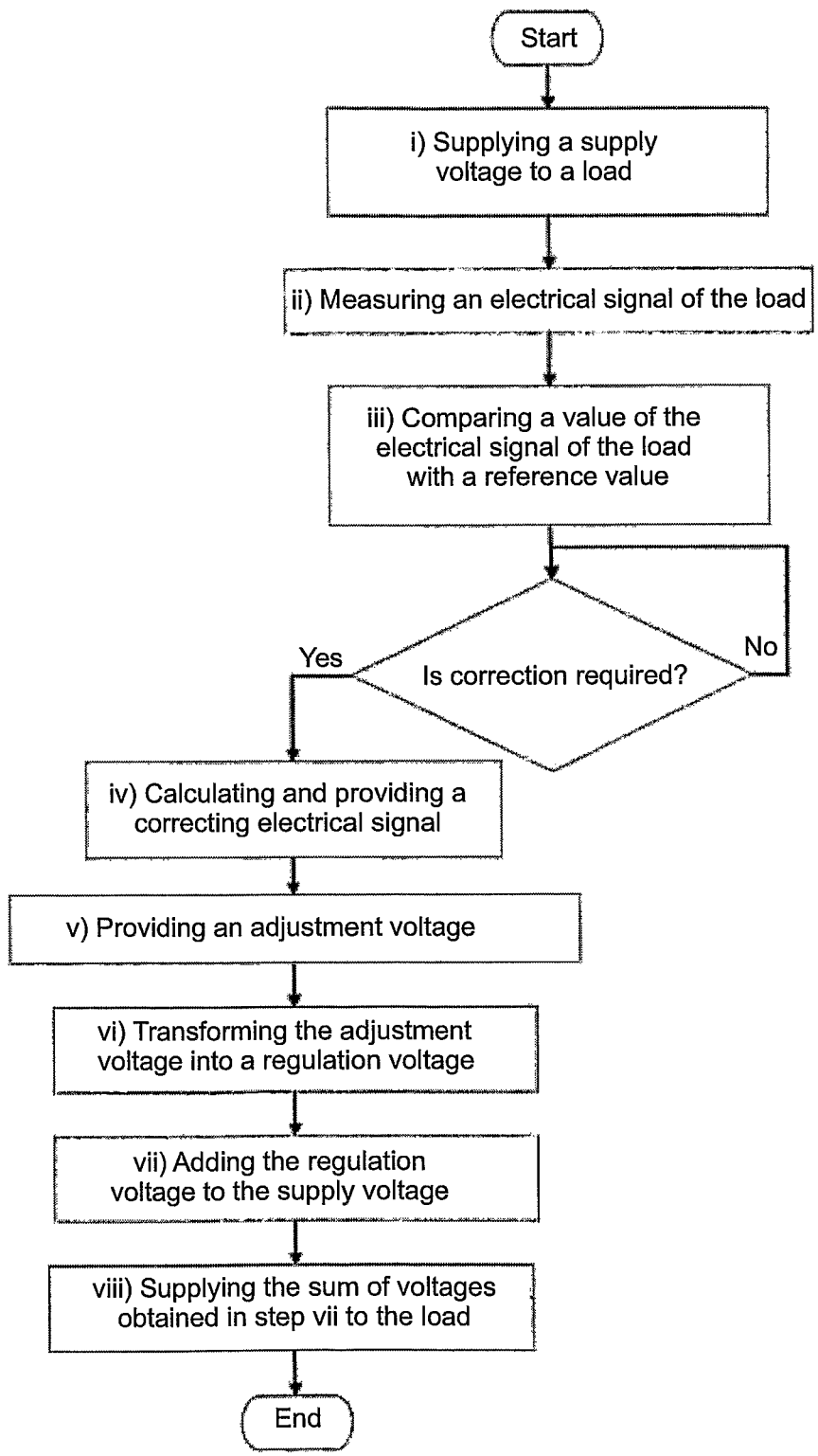
FIG. 2—represents a flowchart of a method for regulating load voltage in power distribution circuits.

FIG. 2 illustrates a flowchart of the steps performed by the system of the present invention. These steps form/compose a method for regulating the voltage of the load C in power distribution circuits.

Said method comprises the steps of:
i) supplying a supply voltage VAL to the load C;
ii) measuring at least one value of an electric signal of the load SCA;
iii) comparison between at least one value of the electric signal of the load SCA obtained in step ii with a pre-established reference value;
iv) calculating and providing a correcting electric signal SCO, preferably, if the result of the comparison of step iii is not comprised by the pre-established tolerance range;
v) providing an adjustment voltage VAJ from the correcting electric signal SCO obtained in step iv;
vi) transforming the adjustment voltage VAJ obtained in step v into a regulation voltage VRE;
vii) adding the regulation voltage VRE obtained in step iv with the supply voltage VAL in module and phase; and
viii) supplying the sum of voltages obtained in step vii for load C.

In step iii described above, it is possible to make a comparison, for example, by calculating the difference in module and phase between the electric signal of the load SCA and the pre-established reference value.

Having described an example of a preferred embodiment, it should be understood that the scope of the present invention encompasses other potential variations, and is limited only by the content of the appended claims, possible equivalents being included therein.

The invention claimed is:

1. System for regulating a load voltage in power distribution circuits comprising at least:
a regulation transformer having a primary winding and a secondary winding, the secondary winding of the regulation transformer being operatively arranged in series between a power source and the load, the power source being capable of providing a supply voltage (VAL) to the load;
a measuring device operatively associated to the load, the measuring device being capable of measuring at least one value of an electric signal of the load (SCA);
a control device operatively associated to the measuring device, the control device being capable of comparing the value of the electric signal of the load (SCA) with a pre-established reference value and providing a correcting electric signal (SCO); and
an actuation device operatively associated to the control device, the actuation device being capable of providing an adjustment voltage (VAJ) proportional to the correcting electric signal (SCO),
the adjustment voltage (VAJ) being applicable to be-fixed electric taps of the primary winding of the regulation transformer, the fixed electric taps being configured to remain immovable when there is a variation of the adjustment voltage (VAJ), the regulation transformer being capable of transforming the adjustment voltage (VAJ) applied to the primary winding into a regulation voltage (VRE) to be applied to the secondary winding, the regulation voltage (VRE) being added in module and phase to the supply voltage (VAL),
the system being characterized by comprising an auxiliary transformer operatively arranged between the power source and the actuation device, the auxiliary transformer being capable of providing an auxiliary voltage (VAU) to the actuation device, the auxiliary transformer consisting of a power transformer having a high voltage side associated to the power source (F) and a low voltage side associated to the actuation device.

2. System according to claim 1, characterized by the actuation device comprising at least an internal power circuit capable of handling the correcting electric signal (SCO) to provide the adjustment voltage (VAJ).

3. System according to claim 2, characterized by the internal power circuit having at least an AC/DC converter and/or a DC/AC converter.

4. System according to claim 1, characterized by the measuring device consisting of a multimeter capable of measuring a voltage signal and/or current signal of the load.

5. System according to claim 1, characterized by the control device comprising at least a microprocessor or a microcontroller capable of running a computer program that allows the provision of the correcting electric signal (SCO) to the actuator device.

6. Method for regulating a load voltage in power distribution circuits, characterized by comprising the steps of:

i) supplying a supply voltage (VAL) to the load;
ii) measuring at least one value of an electric signal of the load (SCA);
iii) making a comparison between at least one value of the electric signal of the load (SCA) obtained in step ii with a preestablished reference value;
iv) calculating and providing a correcting electric signal (SCO);
v) providing an adjustment voltage (VAJ) from the correcting electric signal (SCO) obtained in step iv;
vi) transforming the adjustment voltage (VAJ) obtained in step v into a regulation voltage (VRE);
vii) adding the regulation voltage (VRE) obtained in step iv with the supply voltage (VAL) in module and phase; and
viii) supplying the sum of voltages obtained in step vii to the load (C).

7. Method according to claim 6, characterized by the fact that in step iii the difference in module and phase between the electric signal of the load (SCA) and the reference value is calculated.

* * * * *

UNITED STATES PATENT AND TRADEMARK OFFICE
CERTIFICATE OF CORRECTION

Page 1 of 1

| | |
|---|---|
| PATENT NO. | : 8,552,701 B2 |
| APPLICATION NO. | : 13/054303 |
| DATED | : October 8, 2013 |
| INVENTOR(S) | : Navarro |

It is certified that error appears in the above-identified patent and that said Letters Patent is hereby corrected as shown below:

In the claims

Column 6,
Lines 54 and 55, "tobe-fixed" should read --to fixed--.

Column 7,
Line 4, "power source (F)" should read --power source--.

Column 8,
Line 17, "the load (C)." should read --the load.--.

Signed and Sealed this
Twenty-eighth Day of January, 2014

Michelle K. Lee
*Deputy Director of the United States Patent and Trademark Office*